United States Patent [19]

Young

[11] Patent Number: 4,906,486

[45] Date of Patent: Mar. 6, 1990

[54] APPARATUS AND METHOD FOR COMMINUTING FROZEN FOOD ITEMS

[76] Inventor: J. Winslow Young, 803 E. Center St., Centerville, Utah 84014

[21] Appl. No.: 269,643

[22] Filed: Nov. 10, 1988

Related U.S. Application Data

[63] Continuation-in-part of Ser. No. 145,469, Jan. 19, 1988, abandoned.

[51] Int. Cl.$^4$ .......................... A23P 1/00; B02C 13/28
[52] U.S. Cl. ..................................... 426/518; 241/36; 241/169.1; 241/DIG. 17; 426/524
[58] Field of Search ............................... 426/518, 524; 241/169.1, 36, DIG. 17

[56] References Cited

U.S. PATENT DOCUMENTS 2,905,397  9/1959  De Angelis et al. ........ 241/DIG. 17
4,651,934  3/1987  Bender et al. ........................... 241/36

Primary Examiner—George Yeung
Attorney, Agent, or Firm—J. Winslow Young

[57] ABSTRACT

A comminution and extrusion apparatus and method for comminuting a block of frozen food into a frozen puree and extruding the frozen puree from the apparatus. The food product is prepared from any suitable source of edible food such as fruits, vegetables, dairy products, and artificially produced food items. The edible food is prepared and then frozen into blocks which are shipped and stored in the hard-frozen state. The blocks are processed by comminution to produce a soft frozen food product suitable for immediate consumption. The apparatus includes an electric motor and a rotor that is mounted to the electric motor. A housing encloses the rotor and has a feed port for introducing a block of frozen food into contact with the rotor and a spout for removing frozen puree extruded by the rotor. The rotor includes rows of teeth angularly offset incrementally from parallel to the axis of rotation of the rotor to provide a longitudinal force component to the frozen puree to extrude it from the housing. A lever is removably engaged to the motor in contact relationship with a safety switch so the movement of the lever arm beyond a predetermined position actuates the safety switch to energize the motor. A plunger is pivotally mounted to the lever arm and is used to force the block of frozen food into comminution contact with the rotor upon downward movement of the lever arm.

14 Claims, 4 Drawing Sheets

APPARATUS AND METHOD FOR COMMINUTING FROZEN FOOD ITEMS

RELATED APPLICATIONS

This application is a continuation-in-part application of my copending application Ser. No. 07/145,469 filed 19 January 1988 for FROZEN FOOD PRODUCT now abandoned.

BACKGROUND

1. Field of the Invention

This invention relates to comminution and extrusion apparatus and, more particularly, to a novel comminution and extrusion apparatus and method for finely comminuting a frozen block of frozen food item and extruding the resulting food product.

2. The Prior Art

Freezing a suitably pasteurized food product is an excellent method for preserving the flavor of the food product whether it is obtained from fruit sources, vegetable sources, artificially flavored liquids, dairy products, or combinations of the same. However, any hard-frozen food product from these sources will exhibit a hard, crystalline structure that is difficult to break. When broken, the food product exposes sharp, needle-like crystals of ice. The direct consumption of such frozen products is unpleasant and can be injurious to sensitive mouth tissue.

Numerous attempts are made to provide frozen fruits as whole items (such as berries, cherries and the like) or as large pieces (such as cantaloupes, peaches, and the like). When eaten, these products must be presented in the partially thawed state in an attempt to overcome the problem of hard, difficult to eat items coupled with the corresponding problem of ice crystal formation. Regrettably, freezing also destroys much of the cellular structure of the particular fruit item so that in its partially thawed state the fruit is mushy and lacks a desirable degree of mouth feel. Ice crystals also cause segregation of the water in the frozen item resulting in uneven flavor distribution.

Items such as ice cream eaten in their frozen state require that great care is taken to assure that ice crystal formation is held to a minimum in order to provide the consumer with a product having an appropriate "mouth feel," that is, a desirable tactile sensation in the mouth when eaten. Historically, an answer to the problem of ice crystal formation has been to heavily lace the particular food product with stabilizers such as corn syrups, carrageenan, guar gum, locust bean gum, and the like. It is also a common practice to whip the food product during freezing in order to entrap large quantities of air bubbles. Extensive use is also made of antioxidants, enzyme inhibitors, and texture enhancers such as soy protein and enzyme modified protein concentrates to improve and even control the whipability, texture and creaminess of the finished product.

Another ice cream-type food product is shipped and stored in the liquid state prior to being frozen into a soft frozen product at the retail location. This product has a relatively short shelf life. Also, the original, fresh flavor has been diluted or otherwise obscured by the addition of extraneous products such as stabilizers, antioxidants, enzyme inhibitors, texture enhancers, preservative, and the like.

In view of the foregoing it would be an advancement in the art to provide an apparatus and method that produces a frozen food product which is prepared from sources of fresh edible products such as fruits, vegetables, dairy products and the like, which are suitably pasteurized prior to being hard frozen into billets, blocks, or bricks. A further advancement in the art would be that the frozen billets could be shipped and stored in the hard-frozen state with the hard-frozen billet being suitably comminuted with this novel apparatus prior to retail sale and consumption so as to produce a soft-frozen food product. It would be a significant advancement in the art to have the ice crystals mechanically comminuted to produce a smooth-textured product. Advantageously, the hard frozen state of the billet significantly improves the shelf life of the food product and also retains the fresh flavor of the particular product. Such an invention is disclosed and claimed herein.

BRIEF SUMMARY AND OBJECTS OF THE INVENTION

This invention involves a comminution and extrusion apparatus for grinding a block of hard-frozen food item into a very smooth-textured food product. The food product is initially processed by pasteurization, blending, and the predetermined addition of suitable sweeteners, stabilizers, texturizers, and the like. Preferentially, the block is maintained in the hard-frozen state until it is mechanically comminuted to produce a soft-frozen food product. An electrically driven comminutor includes a rotor with a plurality of rows of teeth protruding from the external periphery of the rotor. The frozen food item is forced against the rotor whereby the rapidly rotating teeth tear away the incoming frozen food item producing a smooth textured, frozen, yet spoonable, food product. The rows of teeth are canted incrementally away from being parallel to the axis of rotation of the rotor so as to impart a coaxial force component to the comminuted food product to extrude the same from the apparatus. Safety features are included to prevent injury to the operator by closing the feed port prior to activation of the rotor.

It is, therefore, a primary object of this invention to provide improvements in apparatus for processing frozen food products.

Another object of this invention to provide improvements in comminution apparatus for comminuting a frozen food item and extruding the same from the comminution apparatus.

Another object of this invention is to provide improvements in the method of producing a novel frozen food product.

Another object of this invention is to provide an apparatus for producing a soft frozen food product from a hard-frozen food item.

Another object of this invention is to provide an apparatus whereby a hard-frozen food item is comminuted to produce a soft frozen food product for immediate consumption.

Another object of this invention is to provide improvements in the method of comminuting a hard-frozen food item and extruding the same as a soft frozen food product.

Another object of this invention is to provide a rotor for a comminution apparatus wherein the rotor includes a plurality of rows of teeth extending from the surface of the rotor, the rows of teeth being canted incrementally from parallel to the axis of rotation of the rotor so as to impart a longitudinal force component to the comminuted food item to extrude the same from the apparatus.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENTS

GENERAL DISCUSSION

Figure 1:
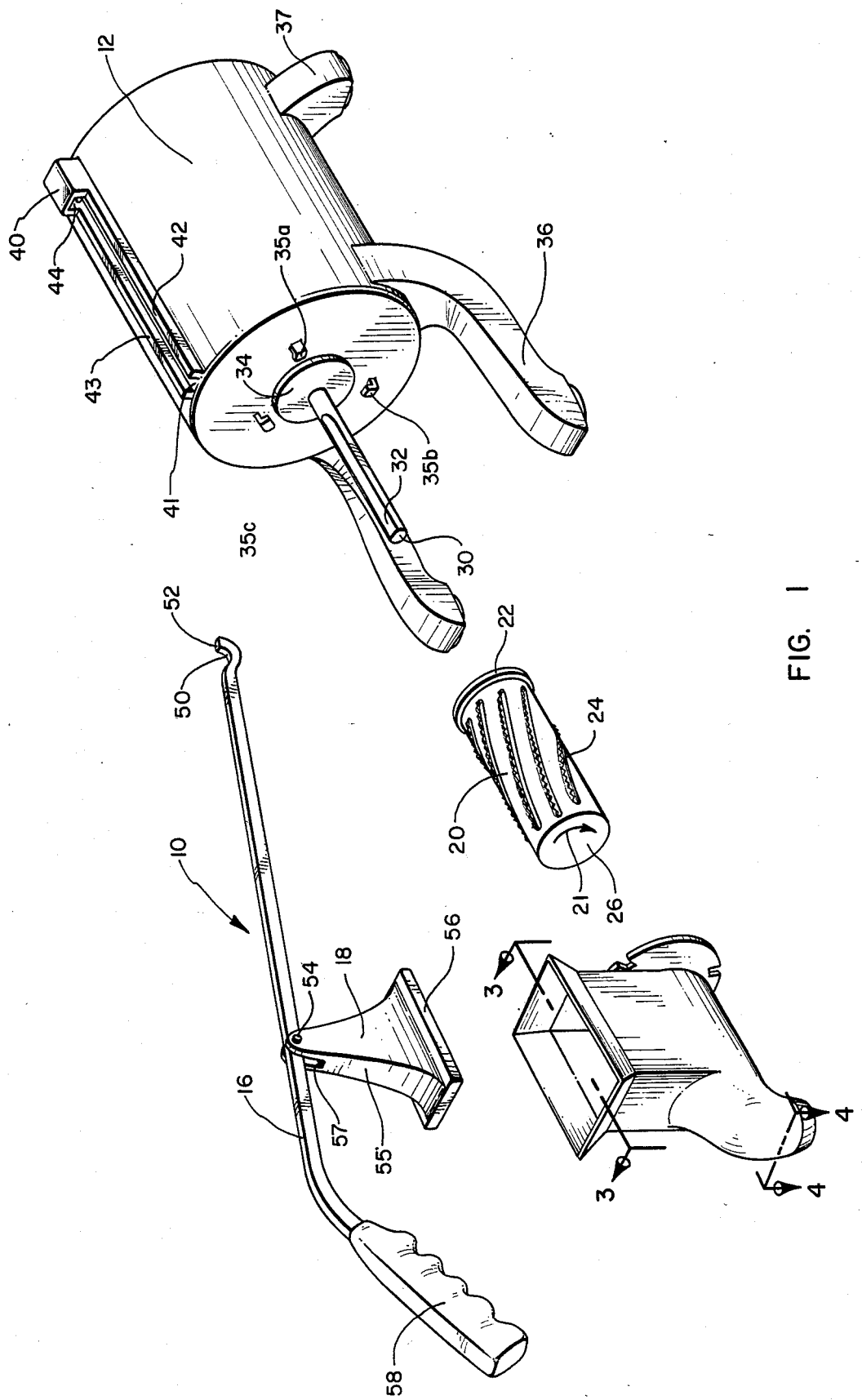
FIG. 1 is an exploded, perspective view of the novel frozen food comminution and extrusion apparatus of this invention.

Freezing is a well-known technique for preserving food products against spoilage and for retaining the desirable flavor characteristics of the original food product. This technology is applied extensively throughout the food industry for numerous food products whether of plant origin such as fruits, nuts, vegetables, plant extracts, etc., or animal origin such as dairy products, meats, and the like. Major industries have evolved around the production, preparation, processing, and freezing of these items along with the subsequent storage, transportation, and distribution of the resulting frozen items. Indeed, it is difficult to imagine a modern society which is not supplied with the numerous food products which are made readily available through the benefits of freezing.

Direct consumption of frozen products requires that it is eaten in a suitably softened condition that it can be readily consumed. The softened condition, historically, has been created either by holding the frozen product in a semisolid state either at a temperature below the freezing point of the product and by including sufficient conditioners, texturizing agents, entrapped air, and the like so that the food product is in a softened state. Products held slightly below the freezing point require careful monitoring and have a significantly shorter shelf life than products held at temperatures significantly below the freezing point of the product. Conditioners, etc., used to retard ice crystal formation can be costly and unnecessarily dilute or otherwise detract from the fresh flavor of the frozen product.

Further, many fruits or other plant products are not readily available for consumption at locations other than in the immediate vicinity where they are grown. For example, certain types of peaches, plums, apricots, and berries, to name a few grown in temperate climates simply can not be shipped in an appropriately ripened state for any reasonable distance without severe degradation of product quality. Likewise, many products grown in tropical or subtropical climates can not be transported in a suitable state for consumption at the destination. Even such a common food item as a pineapple must be picked in a green/ripe state in order to survive the rigors of shipment over long distances. Anyone who has enjoyed the experience of eating a plant-ripened pineapple, a ripe peach from the tree, or any other such food item readily understands the striking difference in flavor and texture between such an item in its green/ripe state and its ripe state.

An apricot is a classic example of a common fruit that is delicious in the tree-ripened state. However, in order to be shipped any significant distance it must be picked in the green/ripe state. Regrettably, the true flavor of an apricot never develops if it has been picked in the latter condition, particularly since most of the flavors develop within the last few days of ripening on the tree.

Raymond Sokolov, a writer whose special interests are the history and preparation of food, has written an article "Stalking the Elusive Apricot, A good-tasting fruit is hard to find," *Natural History* 1/88, pages 76–78. In this article he states "Apricots stop ripening when they are picked. Commercial growers have to pick them as soon as they turn orange but before they get soft enough to spoil enroute to market or develop their full taste. Every once in a while, decent-tasting apricots do get to New York markets, but the statistical likelihood of hitting on these anomalies is so low that anyone who really cares about apricots won't bother to attempt to find them. The virtual certainty of disappointment is too great. This is why California growers sell only 5 percent of their crop as fresh fruit" (at page 76). Mr. Sokolov then briefly set forth some of the current techniques for commercial processing of apricots including drying, preserves, leather, and even brine-and-sugar-cured. Then he states "But none of this can possibly match the miraculous taste of a fully ripe, fresh apricot ∴.." (also at page 76).

The invention is best understood by reference to the drawing wherein like parts are designated by like numerals throughout in conjunction with the following description.

The Apparatus

Figure 2:
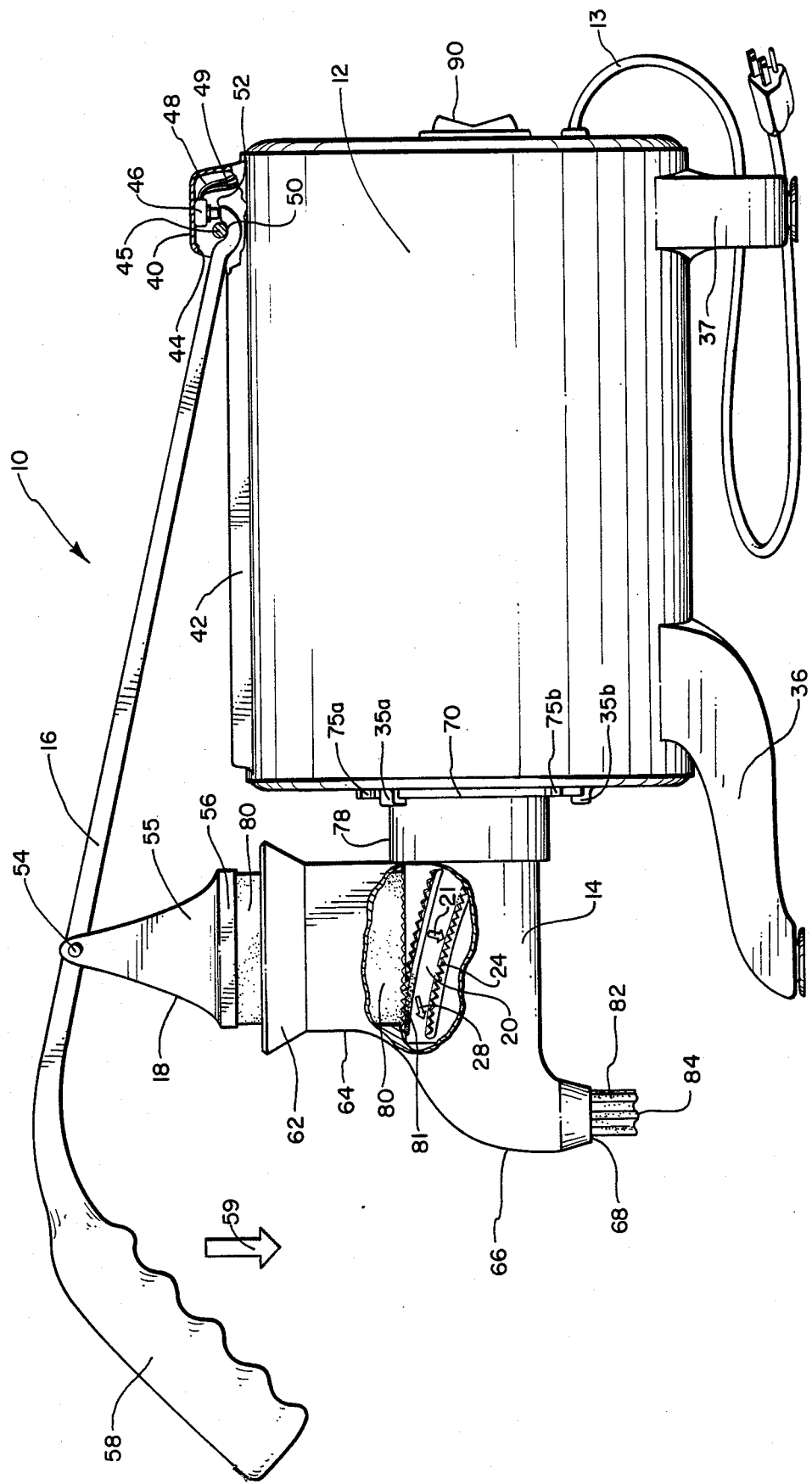
FIG. 2 is a side elevation of the assembled frozen food comminution and extrusion apparatus of FIG. 1 with a portion broken away to reveal internal components.

Referring now to FIGS. 1 and 2, a preferred embodiment of the novel, frozen food comminution apparatus of this invention is shown generally at 10 and includes an electric motor 12, a housing 14, a lever arm 16, a feed piston 18, and a rotatable comminutor/extruder, rotor 20. Motor 12 includes a shaft 30 upon which rotor 20 is mounted and keyed thereto by a keyway 32 (FIG. 1).

Rotor 20 is configured with a generally cylindrical shape terminating in a rounded end 26 and having a plurality of rows of teeth 24 extending from the external periphery of the cylindrical shape. Rounded end 26 on rotor 20 is designed to reduce to the extent possible the residual or dead space in spout 66 of housing 14 to thereby correspondingly reduce the amount of comminuted frozen food 82 retained therein as will be discussed more fully hereinafter.

Teeth 24 are canted incrementally away from a position parallel to the axis of rotation of rotor 20 (as illustrated by arrow 21) so as to impart an incremental longitudinal component of force to comminuted frozen foods comminuted by teeth 24 upon rotation of rotor 20. The longitudinal direction of this extrusion force is illustrated schematically at arrow 28 (FIG. 2). The angle at which teeth 24 are canted from the longitudinal axis of rotation is easily determined by a simple mathematical calculation involving speed of rotation of rotor 20 and its external diameter to thereby create the desired degree of extrusional force to be exerted on the comminuted frozen food 82 (FIG. 2).

Figures 3, 4:
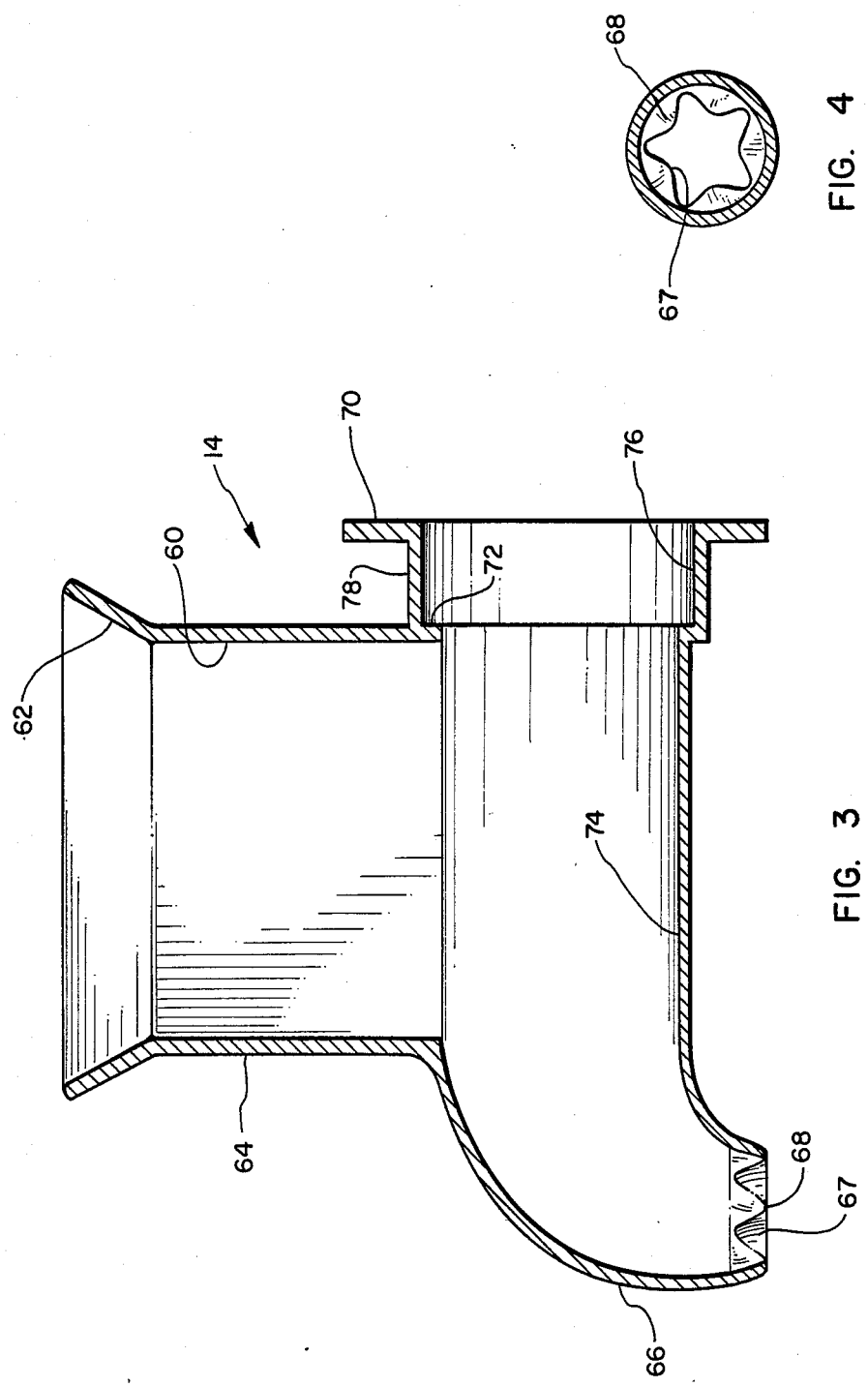
FIG. 3 is a cross sectional view of the housing taken along lines 3—3 of FIG. 1.
FIG. 4 is a cross sectional view of the spout taken along lines 4—4 of FIG. 1.

Referring now also to FIG. 3, housing 14 is designed to telescopically enclose rotor 20 in a chamber 74 when rotor 20 is mounted to shaft 30. A circumferential lip 72 acts as an abutment against base 22 to thereby assure that rotor 20 is fully mounted over shaft 30. A bearing housing 76 fits over a bearing 34 the diameter of which corresponds to the diameter of base 22 both of which are telescopically received inside bearing housing 76 when housing 14 is mounted to motor 12. A flange 70 on the basal periphery of housing 14 includes a plurality of detents 75a and 75b for releasably interlocking housing 14 to motor 12. In particular, a matching set of retainers 35a-35c on the face of motor 12 fits through the openings of detents 75a and 75b to allow flange 70 to be rotated and thereby interlocked to the face of motor 12 by retainers 35a-35c.

Housing 14 includes a feed port 64 having a throat 60 dimensionally configured to receive therethrough frozen food block 80 (FIG. 2). The upper terminus of feed port 64 includes an upwardly flared funnel 62 which serves as a guide to assist the operator in inserting frozen food block 80 into throat 60. Frozen food block 80 is pressed downwardly against the rapidly rotating rotor 20 (as indicated schematically by arrow 21) where teeth 24 tear away the approaching surface 82 of frozen food block 80. The speed of rotation of rotor 20 and the plurality of rows of teeth 24 comminute surface 81 to produce a very fine puree 82 of frozen food block 80. The canted orientation of teeth 24 creates a longitudinal component of thrust to the puree 82 as indicated schematically at arrow 28 to cause the same to be extruded downwardly through spout 66 and nozzle 68.

Nozzle 68 is configured with generally star-shaped design created by indents 67 which cause a corresponding indentations 84 in puree 82 as it is extruded from nozzle 68. In addition to creating a decorative design in puree 82, indents 67 restrict the inadvertent insertion of a finger (not shown) upwardly through nozzle 68 into contact with rotor 20. The design of spout 66 also dimensionally corresponds with the rounded end 26 of rotor 20 so as to reduce, to the extent practicable, the amount of dead space in spout 66.

Motor 12 rests on feet 36 and 37 and receives electrical energy through an electrical cord 13. A primary switch 90 (FIG. 2) on the back of motor 12 controls electrical power to motor 12 and cooperates with a safety switch 46 inside a switch housing 40. Safety switch 46 is designed to be activated by a contact 52 on the end of lever arm 16. In particular, a pivot 45 inside switch housing 40 releasably engages a detent 50 so that downward movement of lever arm 16 brings contact 52 upwardly into engagement with safety switch 46.

A pair of guides 42 and 43 extend from switch housing 40 to serve as guides for lever arm 16. Lever arm 16, or, more particularly, contact 52 is inserted through opening 44 until detent 50 is engaged by pivot 45 at which time lever arm 16 is lowered into a channel 41 between guides 42 and 43 with guides 42 and 43 restricting lateral movement of lever arm 16.

Lever arm 16 includes a handle 58 at the end opposite detent 50. Downward movement of lever arm 16 beyond a predetermined position causes a contact 52 to engage electrical switch 46. Activation of electrical switch 46 closes the electrical circuit between wires 48 and 49 thereby electrically activating motor 12. The relative orientation between the position of lever arm 16 and activation of electrical switch 46 is carefully predetermined so that plunger 56 is in the desired location prior to energizing motor 12.

Plunger 18 is pivotally mounted to lever arm 16 by a pivot 54. Importantly, pivot 54 is restricted in the degree by which plunger 18 may be pivoted thereby precluding the operator (not shown) from inadvertently moving plunger 18 aside and inserting fingers or an entire hand into throat 60 while motor 12 is energized. The degree of restriction to the arcuate distance plunger 18 may be pivoted about pivot 54 is determined by the width of slot 57 and its spatial separation from the bottom edge of lever arm 16.

Plunger 18 includes a column 55 terminating in a foot 56. Column 55 is configured with a generally triangular configuration so as to contribute significantly to the robust configuration of plunger 18. In particular, foot 56 is designed to be placed against frozen food block 80 and, upon the application of a downward force on handle 58, force frozen food block 80 into contact with rotor 20. The leverage afforded by lever arm 18 means that considerable force can be exerted on all affected components by the operator (not shown). Accordingly great care is taken to assure that all relevant components of comminution/extrusion apparatus 10 are significantly robust so as to preclude damage to the same during normal usage.

The length of feed port 64 is coordinated with the length of frozen food block 80 so as to contribute to an important safety feature of this invention; namely, that a plunger 56 must be brought into close proximity to the upper end of throat 60 before motor 12 is activated as will be discussed more fully hereinafter. This important feature blocks throat 60 against accidental insertion of a hand or fingers through throat 60 into contact with rotor 20 when rotor 20 is in operation.

Importantly, frozen food block 80 must fit downwardly into throat 60 a sufficient distance so that plunger 56 can then be lowered sufficiently to initiate activation of motor 12. This means that a frozen food block 80 that is too long will not be processed because it will not allow motor 12 to become activated. Otherwise, a person (not shown) could accidentally place a hand under plunger 56 with motor 12 running with potentially catastrophic results.

The length of column 55 is also selectively predetermined so as to hold the bottom of foot 56 an incremental distance above rotor 20 when plunger 18 has been depressed completely into throat 60 as determined by lever arm 16 contacting the bottom of channel 41. Channel 41 is formed between guides 42 and 43 which serve to restrict the lateral movement of lever arm 16 once pivot 50 has engaged pivot pin 45. Channel 41 is configured as the top surface of motor 12 and serves as a stop to the downward movement of lever arm 16 as illustrated schematically by arrow 59.

Motor 12 is sufficiently powerful that it can be activated with frozen food block 80 pressed against rotor 20 prior to contact 52 activating electrical switch 46. This means that motor 12 must turn rotor 12 with frozen food block 80 pressed firmly against rotor 20 prior to its starting to rotate. This is an important safety feature because of the need to close off throat 60 against the operator using any part of the hand to push frozen food block 80 into contact with rotor 20 as set forth hereinbefore.

Motor 12 rests on feet sets 36 and 37. It will be noted that feet set 36 extends forwardly beyond the front end of motor 12 so as to support motor 12 against being tilted upon application of downward forces against lever arm 16.

The Method

Figure 5:
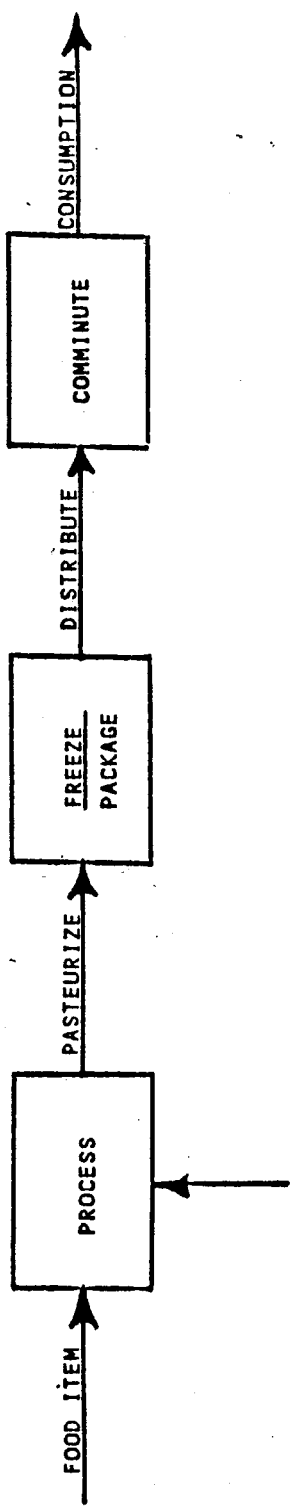
FIG. 5 is a flow diagram for the process for producing a spoonable frozen food item with the comminution and extrusion apparatus of this invention.

Referring now to FIG. 5, a flow diagram is shown for processing the particular food item from the fresh state to ultimate consumption. Importantly, the food item is obtained near its source of production and at its peak of flavor. Numerous fruits are especially amenable to this process and include, by way of nonlimiting example, apricots, peaches, plums, pineapple, cherries, bananas, kiwis, strawberries, raspberries, grapes, oriental pears, persimmons, to name a few of the more popular temperate zone and subtropical fruits.

Other fruits that are rarely seen in temperate zones but are consumed locally in tropical regions should also provide a readily available source of food items for this process. The important advantage is that the food item is processed near its source so as to significantly reduce injury and spoilage and to effectively eliminate the need to pick the fruit in an unripened state. Bananas and most pears possibly are the only exceptions to this latter advantage since they are customarily picked in either the green or near-ripe state.

Additives may or may not be included with the particular food item, depending upon the specific requirements of the food item. For example, certain food items such as plums and apricots required the addition of a suitable diluent such as milk, juice, or water. Sweetening agents such as sucrose, corn syrup, artificial sweeteners, and the like, are added to provide the desired degree of sweetening to the product. Certain fruit such as certain varieties of apples, peaches, etc. require little or no additional sweetening agents since they contain a desirable amount of natural sugars.

Where necessary, other well-known extenders, stabilizers, conditioners, and the like, may be added in limited quantities to the food item although every attempt is made to reduce all additives to a minimum. Importantly, it is highly desirable to provide the soft frozen food product with the closest possible approximation in flavor to the fresh food item. This feature is important since the principal advantage of this process is the knowledge on the part of the consumer that the food product is relatively free from unnecessary additives.

The processing step involves preparing the food item as necessary to provide an edible product. Processing includes peeling, pitting, straining, blanching, chopping, pureeing, and the like. Also included in the processing step is a blending step for the appropriate types and amounts of additives, such as sweeteners or diluents, as required.

Importantly, pasteurization of the resulting blend kills any harmful organisms in the blend to assure the safety of the food product. This technology is well known in the art and is commonly applied to numerous food items for this purpose.

The pasteurized food product is immediately frozen into billets of predetermined sizes for subsequent processing in the comminution apparatus. The size of the billets is selectively chosen so as to provide a size that can be introduced into the comminution apparatus to provide the consumer with a desirable quantity of soft frozen food product for consumption.

EXAMPLE 1

One particular variety of peach, Early White Giant Peach, available from Stark Bros. Nurseries, Louisiana, Mo., ripens early in the season shortly after apricots. This peach is a freestone variety with an attractive, red blush on the skin. The flesh is white as the name indicates and is very tender and juicy. The flavor of this peach is outstanding when the peach is allowed to ripen on the tree. However, the tender flesh of the tree-ripened peach precludes its being transported any reasonable distance from the orchard. Accordingly, the average consumer or shopper in a grocery store will never experience this delightful fruit.

Several dozen Early White Giant peaches were picked from the tree at the peak of ripeness and flavor. Each peach was peeled, pitted and quartered. The individual quarters were placed on a tray, lightly sprinkled with sugar, sucrose, and the tray was placed in a domestic freezer. Subsequently, the frozen peach quarters were bagged in plastic freezer bags for storage in the freezer. For consumption, several frozen peach quarters were removed from the freezer bags and processed in a comminution device to produce a soft frozen fruit product.

The comminution apparatus reduced in size all the ice crystals in the frozen peach product so that the texture was similar to a soft ice cream. Importantly, the soft frozen peach not only had a soft, smooth texture but the flavor was that of a fresh, tree-ripened peach.

EXAMPLE 2

Some of the peaches obtained for Example 1, above, were also peeled and pitted before the flesh was lightly pureed in a domestic blender. Two tablespoons corn syrup were mixed into each pint of puree as a sweetener. The sweetened puree was poured into individual molds which were then frozen in the domestic freezer. The billets of frozen puree were then removed from the molds. Some of the frozen billets of puree were comminuted as in Example 1 to produce a smooth-textured, soft frozen peach product that retained the fresh, tree-ripened flavor of the peach.

The remainder of the frozen billets of peach puree were placed in plastic bags and held in the freezer for several weeks. Examination of the stored billets revealed the expected ice crystal growth within the billet. However, upon comminution, as above, the resulting product was a delicious, smooth textured, soft frozen peach product that still retained the fresh, tree-ripened flavor of the peach. Importantly, the comminution apparatus reduced any large ice crystals to such a small size as to be almost unnoticeable in the final product.

EXAMPLE 3

Tree-ripened apricots were picked and each were split into halves to remove the pit. The halves were then placed into the freezer until frozen solid. Some of the frozen halves were bagged in polyethylene bags for storage and the rest were processed in comminution apparatus 10. The resulting, soft-frozen apricot product had a smooth texture and retained the fresh flavor of the apricot although the flavor tended to be somewhat intense.

Milk was blended with sucrose in the ratio of about one-half cup sucrose to one quart milk. The milk solution was frozen in individual billets that could be processed in the comminution apparatus. A second apricot food product was then produced by processing frozen apricots wit an equal quantity of the frozen milk solution. The resulting blend of apricots and sweetened milk was a smooth, soft frozen product that was delicious to the taste. Sweetened water, pineapple juice, and the like could be substituted for the milk although the milk appeared to provide a desirable degree of mellowness to the otherwise intense flavor of the pure apricot.

EXAMPLE 4

Tree ripened plums, a variety known as Elephant Heart, were pitted and then pureed. The plum puree was frozen in billets. The frozen billets were processed in comminution apparatus 10 to produce a soft frozen plum product which retained the fresh flavor of the plums. However, like the first apricot product of Example 3 the plum product also tended to be quite intense in flavor and it was found advantageous to blend the sweetened, frozen milk of Example 3 with the plum in equal amounts of plum and milk. The resulting plum product was smooth textured and retained the fresh-picked plum flavor.

EXAMPLE 5

Fresh apple juice was produced from Golden Delicious apples and frozen in billets suitable for processing through the comminution apparatus. No sweeteners were necessary since the apples were picked at their peak of flavor and naturally contained the desired degree of sweetness. The billets were processed through the comminution apparatus. The resulting product retained the fresh apple flavor and had a smooth, soft-frozen texture.

EXAMPLE 6

Vine-ripened cantaloupe were halved to remove the seeds and then peeled before the remaining flesh was cut into chunks. The size of the chunks was preselected so as to accommodate being processed in the comminution apparatus. After being frozen, the frozen chunks of cantaloupe were comminuted and produced a delicious, soft-frozen cantaloupe product. Importantly, the subtle flavor of the vine-ripened cantaloupe was presented in a soft-frozen product without intrusion by other flavors such as one would experience if conditioners, etc., were included with the cantaloupe.

EXAMPLE 7

A package of powdered drink mix which normally is mixed with two quarts water along with one cup of sucrose to produce an artificially flavored drink was mixed with three pints of water and one cup of sucrose. The resulting solution was frozen into billets. The billets were processed through a comminution apparatus to produce a soft frozen product that was smooth in texture and very pleasant to eat.

It is well-known that numerous fruits such as watermelon, cantaloupe, certain peaches, etc., do not lend themselves to being frozen and supplied to the consumer in a frozen state. The high water content, when frozen, results in a mushy, unappetizing product when thawed. However, I have discovered that if this same fruit is delivered to the site of consumption in a hard-frozen state, whether chunks or puree, and the hard-frozen product comminuted into a soft-frozen product, the resulting product is delicious and is readily acceptable to the consumer. Advantageously, the types of fruits, vegetables, or even artificially derived products that can be used according to the teachings of this invention are almost endless.

Frozen food comminutor/extrusion apparatus 10 is assembled by mounting rotor 20 on shaft 30 so that keyway 32 mates with a corresponding keyway (not shown) inside rotor 20. Housing 14 is then placed over rotor 20 and interlocked to the face of motor 12 by passing detents 75a and 75b over retainers 35a and 35b then rotating housing 14 upwardly to place throat 60 in the vertical position. Lever arm 16 is then mounted to motor 12 by engaging pivot 50 with pin 45. At this point electrical cord 13 is plugged into an appropriate electrical outlet capable of supplying electrical energy to motor 12.

A block of frozen food 80 is inserted in throat 60. Switch 90 is turned on and then plunger 18 is lowered against frozen food block 80. Upon reaching a preselected position lever arm 16 activates electrical switch 46 to energize motor 12. Rotor 20 through the rapidly whirling rows of teeth 24 tears away at the downwardly approaching surface of frozen food block 80 creating a very smooth textured puree 82 of frozen food. The canted orientation of rows of teeth 24 creates a longitudinal, coaxial component of force in puree 82 to extrude the same through nozzle 66 and out of spout 68. Indents 67 inside spout 68 form a decorative pattern 84 in the surface of puree 82.

Upon completion of the particular comminution/extrusion cycle, switch 90 is turned to the off position and, for added safety, electrical cord 13 is unplugged from the electrical outlet (not shown). Lever arm 16 is then disengaged from pin 45 and removed from safety switch housing 40. Housing 14 is rotated to place detents 75a and 75b under retainers 35a and 35b to allow housing 14 to then be pulled longitudinally from rotor 20. Rotor 20 is then pulled from shaft 30. Plunger 18, housing 14, and rotor 20 can then be easily cleaned and, if desired, reassembled on motor 12 for later use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A comminution apparatus for comminuating a block of frozen food comprising:
    an electric motor having a shaft extending from the motor;
    a rotor removably mounted to the shaft, the rotor including a cylindrical rotor body having a plurality of rows of teeth extending outwardly from the cylindrical surface of the rotor, the rows of teeth being parallel and offset from being parallel to the axis of rotation of the rotor so as to create a longitudinal component of thrust to puree created by said rows of teeth as they comminute a block of frozen food brought into contact with said rotor, said longitudinal component of thrust being in a direction away from said motor;
    a housing for the rotor, said housing being releasably mountable to the motor, the housing including a chamber surrounding a substantial portion of the rotor with a feed port into the chamber and a spout from the chamber.

a plunger means for forcing the block of frozen food through the feed port into contact with the rotor; and safety switch means to preclude activation of the electric motor in the event the feed port is open.

2. The comminution apparatus defined in claim 1 wherein the rotor includes a rounded end extending into the spout to reduce dead space volume in the spout.

3. The comminution apparatus defined in claim 1 wherein the spout includes a downwardly directed nozzle, the nozzle including an opening having a plurality of protuberances extending incrementally into the opening, the protuberances restricting the opening and imparting a decorative profile to the external surface of said puree.

4. The comminution apparatus defined in claim 1 wherein the feed port of the housing is dimensionally configured to receive a block of frozen food item within the confines of the feed port with the plunger in a position to block the entry to the feed port.

5. The comminution apparatus defined in claim 1 wherein the plunger means includes a lever arm with a plunger pivotally mounted to the lever arm at a position where it can be inserted into the feed port.

6. The comminution apparatus defined in claim 5 wherein the lever arm is releasably mountable to the motor and the safety switch means comprises a contact that is engaged by the lever arm to energize the safety switch when the lever arm is moved to a preselected position with the plunger adjacent the feed port.

7. The comminution apparatus defined in claim 5 wherein the pivotal mounting for the plunger is a restricted pivot to preclude the lever arm being lowered without the plunger passing into the feed port.

8. The comminution apparatus defined in claim 1 wherein the safety switch means also includes a manually operated electrical switch.

9. A comminution apparatus for comminuting a block of frozen food into a spoonable serving of smooth-textured, frozen food comprising;

an electric motor having a drive shaft extending from the motor;

a rotor for comminuting a block of frozen food, the rotor comprising a cylindrical body with a plurality of rows of teeth extending incrementally from the surface of the cylindrical body, the rotor being coaxially mounted on the drive shaft;

a housing for the rotor releasably secured to the motor, the housing including a chamber enclosing a substantial portion of the rotor, the housing including a feed port for introducing a block of frozen food into the chamber into contact with the rotor and a spout for extrusion of frozen food comminuted by the rotor;

a plunger for forcing the block of frozen food through the feed port and against the rotor;

a lever arm pivotally connected to the plunger for imparting additional leverage against the plunger; and safety switch means for controlling electrical energy to the electric motor, the safety switch means including contact means actuated by the lever arm at a preselected position relative to the feed port.

10. The comminution apparatus defined in claim 9 wherein the rows of teeth are generally parallel on the cylindrical surface and offset from being parallel to the axis of rotation of the rotor by an incremental degree, the offset creating a longitudinal component of thrust to frozen food comminuted by the rotor, the direction of the longitudinal component of thrust being in a direction generally away from the electric motor toward the spout.

11. The comminution apparatus defined in claim 9 wherein the feed port includes a throat dimensionally configured to receive therein the block of frozen food so that when the plunger is brought into proximity to the block of frozen food the plunger will effectively occlude the throat and the lever arm will be lowered into a position that the contact means of the safety switch means is actuated by the lever arm.

12. The comminution apparatus defined in claim 9 wherein the pivotal connection between the lever arm and the plunger is a limited pivot, the limited pivot comprising a slot in the upper end of the plunger with the lever arm pivotally mounted to the plunger in the slot, the depth of the slot being selectively predetermined to limit the degree of pivotal movement of the plunger by contacting the lever arm thereby precluding the lever arm being lowered sufficiently to engage the contact means of the safety switch means without the plunger passing into the throat.

13. A method for producing a frozen puree having a spoonable consistency by comminuting a block of frozen food into the frozen puree and extruding the frozen puree comprising:

selecting an edible food product from the group consisting of fruits, vegetables, dairy products, plant extracts, and artificially flavored liquids;

freezing said edible food product into a frozen block of frozen, edible food product;

packaging said frozen block;

shipping and storing said frozen block in said frozen state; and introducing said frozen block into a comminution apparatus to produce a frozen puree of edible food product having a spoonable consistency, said comminution apparatus comprising an electric motor having a drive shaft, a rotor being removably mounted to the drive shaft, the rotor including a cylindrical body and a plurality of rows of teeth extending an incremental distance from the surface of the rotor, the cylindrical body being mounted coaxially on the drive shaft, a housing enclosing the rotor, the housing including a chamber for enclosing the rotor and a feed port for introducing the block of frozen food into the chamber into contact with the rotor thereby producing the frozen puree, the chamber including a spout for directing the frozen puree from the chamber, a lever arm is removably engaged to the motor in contact relationship with a safety switch so that movement of the lever arm beyond a preselected position actuates the safety switch to energize the motor, and a plunger is pivotally mounted to the lever arm for forcing the block of frozen food through the feed port into comminution contact with the rotor upon downward movement of the lever arm.

14. The method defined in claim 13 wherein t the rows of teeth of the rotor are oriented at a position angularly offset incrementally from parallel to the axis of rotation of the cylindrical body, the angular offset creating a longitudinal component of thrust to the frozen puree away from the electric motor thereby extruding the frozen puree through the spout.

* * * * *